(12) United States Patent
Falardeau et al.

(10) Patent No.: US 7,730,051 B2
(45) Date of Patent: Jun. 1, 2010

(54) SYSTEM AND METHOD FOR EMBEDDED EXPRESSION ASSIGNMENT

(75) Inventors: Simon Falardeau, Laval (CA); Jerome Poulin, Montreal (CA); Dai Nguyen, Brossard (CA)

(73) Assignee: SAP Aktiengesellschaft, Walldorf (DE)

( * ) Notice: Subject to any disclaimer, the term of this patent is extended or adjusted under 35 U.S.C. 154(b) by 373 days.

(21) Appl. No.: 11/880,542

(22) Filed: Jul. 23, 2007

(65) Prior Publication Data

US 2009/0030928 A1    Jan. 29, 2009

(51) Int. Cl.
*G06F 7/00* (2006.01)

(52) U.S. Cl. .................................. 707/707; 707/712

(58) Field of Classification Search ............. 707/1–10, 707/100–102, 200–205
See application file for complete search history.

(56) References Cited

U.S. PATENT DOCUMENTS

| | | | |
|---|---|---|---|
| 4,752,877 A | 6/1988 | Roberts et al. | |
| 5,315,508 A | 5/1994 | Bain et al. | |
| 5,400,253 A | 3/1995 | O'Connor | |
| 5,615,109 A | 3/1997 | Eder | |
| 5,758,327 A | 5/1998 | Gardner et al. | |
| 5,870,716 A | 2/1999 | Sugiyama et al. | |
| 5,930,771 A | 7/1999 | Stapp | |
| 5,970,490 A * | 10/1999 | Morgenstern | 707/10 |
| 5,974,407 A * | 10/1999 | Sacks | 707/2 |
| 5,999,914 A | 12/1999 | Blinn et al. | |
| 6,029,139 A | 2/2000 | Cunningham et al. | |
| 6,064,984 A | 5/2000 | Ferguson et al. | |
| 6,260,024 B1 | 7/2001 | Shkedy | |
| 6,341,351 B1 | 1/2002 | Muralidhran et al. | |
| 6,505,093 B1 | 1/2003 | Thatcher et al. | |
| 6,507,851 B1 | 1/2003 | Fujiwara et al. | |
| 6,701,299 B2 | 3/2004 | Kraisser et al. | |
| 6,725,204 B1 | 4/2004 | Gusley | |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,080,030 B2 | 7/2006 | Eglen et al. | |
| 7,082,408 B1 | 7/2006 | Baumann et al. | |
| 7,092,929 B1 | 8/2006 | Dvorak et al. | |
| 7,117,165 B1 | 10/2006 | Adam et al. | |

(Continued)

FOREIGN PATENT DOCUMENTS

JP      2004-030343 A      1/2004

(Continued)

OTHER PUBLICATIONS

U.S. Appl. No. 60/374,892, filed Apr. 22, 2002, Krajec.

(Continued)

*Primary Examiner*—Wilson Lee
(74) *Attorney, Agent, or Firm*—Foley & Lardner LLP (57) ABSTRACT

A system for generating embedded expressions configured to generate a result. The system includes an embedded expression generation engine configured to generate a root expression, including at least one parameter. The parameter includes an assigned embedded expression configured to generate a result based on one or more input parameters. The system further includes an embedded expression user interface configured to display the root expression and associated parameters and embedded expressions and provide expression generation tools allowing the user to modify the root expression.

20 Claims, 4 Drawing Sheets

U.S. PATENT DOCUMENTS

| | | | |
|---|---|---|---|
| 7,124,098 B2 | 10/2006 | Hopson et al. | |
| 7,124,984 B2 | 10/2006 | Yokouchi et al. | |
| 7,139,731 B1 | 11/2006 | Alvin | |
| 7,197,559 B2* | 3/2007 | Goldstein et al. | 709/224 |
| 2001/0019778 A1 | 9/2001 | Gardaz et al. | |
| 2001/0032130 A1 | 10/2001 | Gabos et al. | |
| 2001/0039517 A1 | 11/2001 | Kawakatsu | |
| 2001/0049634 A1 | 12/2001 | Stewart | |
| 2002/0013731 A1 | 1/2002 | Bright et al. | |
| 2002/0023500 A1 | 2/2002 | Chikuan et al. | |
| 2002/0026368 A1 | 2/2002 | Carter, III | |
| 2002/0059108 A1 | 5/2002 | Okura et al. | |
| 2002/0072986 A1 | 6/2002 | Aram | |
| 2002/0073114 A1 | 6/2002 | Nicastro et al. | |
| 2002/0078159 A1 | 6/2002 | Petrogiannis et al. | |
| 2002/0107713 A1 | 8/2002 | Hawkins | |
| 2002/0116241 A1 | 8/2002 | Sandhu et al. | |
| 2002/0123930 A1 | 9/2002 | Boyd et al. | |
| 2002/0138290 A1 | 9/2002 | Metcalfe et al. | |
| 2002/0147668 A1 | 10/2002 | Smith et al. | |
| 2002/0152128 A1 | 10/2002 | Walch et al. | |
| 2002/0156772 A1* | 10/2002 | Chau et al. | 707/3 |
| 2002/0184116 A1 | 12/2002 | Tam et al. | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0074269 A1 | 4/2003 | Viswanath | |
| 2003/0120686 A1* | 6/2003 | Kim et al. | 707/200 |
| 2003/0126024 A1 | 7/2003 | Crampton et al. | |
| 2003/0144916 A1 | 7/2003 | Mumm et al. | |
| 2003/0149631 A1 | 8/2003 | Crampton et al. | |
| 2003/0149674 A1 | 8/2003 | Good et al. | |
| 2003/0158791 A1 | 8/2003 | Gilberto et al. | |
| 2003/0167265 A1* | 9/2003 | Corynen | 707/4 |
| 2003/0171998 A1 | 9/2003 | Pujar et al. | |
| 2003/0172007 A1 | 9/2003 | Helmolt et al. | |
| 2003/0200150 A1 | 10/2003 | Westcott et al. | |
| 2003/0208365 A1 | 11/2003 | Avery et al. | |
| 2003/0229502 A1 | 12/2003 | Woo | |
| 2004/0010463 A1 | 1/2004 | Hahn-Carlson et al. | |
| 2004/0098358 A1 | 5/2004 | Roediger | |
| 2004/0122689 A1 | 6/2004 | Dailey et al. | |
| 2004/0162763 A1 | 8/2004 | Hoskin et al. | |
| 2004/0172321 A1 | 9/2004 | Vemula et al. | |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2004/0267674 A1 | 12/2004 | Feng et al. | |
| 2005/0015303 A1 | 1/2005 | Dubin et al. | |
| 2005/0055283 A1 | 3/2005 | Zarovinsky | |
| 2005/0060270 A1 | 3/2005 | Ramakrishnan | |
| 2005/0065965 A1* | 3/2005 | Ziemann et al. | 707/102 |
| 2005/0075915 A1 | 4/2005 | Clarkson | |
| 2005/0075941 A1 | 4/2005 | Jetter et al. | |
| 2005/0086122 A1 | 4/2005 | Cirulli et al. | |
| 2005/0086125 A1 | 4/2005 | Cirulli et al. | |
| 2005/0096122 A1 | 5/2005 | Nireki et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0171825 A1 | 8/2005 | Denton et al. | |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2007/0050272 A1 | 3/2007 | Godlewski et al. | |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World,* vol. 162, No. 22, Nov. 9, 1993 (p.50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education,* Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management,* vol. 37, No. 1, Jan./Feb. 1995 (pp. 1-2).

\* cited by examiner

THIS EXPRESSION CHECKS IF THE PURCHASING PRICE OF THE ARTICLE SAP_JACKET IS GREATER THAN THE CURRENT SALES PRICE OF THE ARTICLE IN CHINA.

| PARAMETER | TYPE | MODE | ASSIGNED VALUE | DESCRIPTION |
|---|---|---|---|---|
| ▽⊕ GREATER_THAN | EXPRESSION-COMPARE | | | GREATER THAN COMPARISON |
| ▽ ☐ EKPGR | EKPGR | INPUT | GET_PURCHASING_PRICE | BASIC PUR.PR. |
| ▽⊕ GET PURCHASING PRICE | EXPRESSION - METHOD_CALL | | | RETURNS THE PURCHASED PRICE OF AN ARTICLE |
| △ ☐ I_ARTICLE | MATNR | INPUT | SAP_JACKET | MATERIAL NUMBER |
| ☐ R_PRICE | EKPGR | OUTPUT | | PURCHASE PRICE CALCULATION: (BASIC PURCHASE PR |
| ▽ ☐ EKPGR | EKPGR | INPUT | GET_SALES_PRICE | BASIC PUR.PR. |
| ▽⊕ GET_SALES_PRICE | EXPRESSION-METHOD_CALL | | | RETURNS THE SALES PRICE OF AN ARTICLE |
| △ ☐ I_ARTICLE | MATNR | INPUT | SAP_JACKET | MATERIAL NUMBER |
| △ ☐ I_DATE | DATUM | INPUT | GET_CURRENT_DATE | DATE |
| ▽⊕ GET_CURRENT_DATE | EXPRESSION - METHOD_CALL | | | RETURNS THE CURRENT DATE |
| ☐ R_DATE | DATUM | OUTPUT | | DATE |
| ▽ ☐ I_STORE | WKFEI | INPUT | GET_STORE | PLANT |
| ▽⊕ GET_STORE | EXPRESSION - METHOD_CALL | | | RETURNS A STORE ID |
| △ ☐ I_COUNTRY | LANDX | INPUT | CHINA | COUNTRY NAME |
| ☐ R_STORE | WKFEI | OUTPUT | | PLANT |
| ☐ R_PRICE | EKPGR | OUTPUT | | PURCHASE PRICE CALCULATION: (BASIC PURCHASE PR |

FIG. 4

SYSTEM AND METHOD FOR EMBEDDED EXPRESSION ASSIGNMENT

BACKGROUND OF THE INVENTION

The present invention relates generally to the field of rules engines that process data based on complex rules. More specifically, the present invention relates to systems and methods for generating generic expressions to perform operations on specific data or to be embedded to perform complex operations on specific data.

Large number of data elements may be created where each data element represents a discrete item, concept, class of items, etc. The data elements may be associated with a plurality of data element fields. The data elements and data element fields may have been created over time, by a different set of users, represent a wide variety of objects, etc. such that a variety of structures may be associated with the data element and/or the data element fields.

It may be necessary to apply general rules to a large number of the data elements despite the different types of data elements and/or data element fields. A user is often required to define a large number of rules to account for the wide variety of structures.

What is needed is a system and method for implementing rule creation allowing creation of embeddable generic expressions to perform operations on certain data types. What is further needed is such a system and method including a user interface configured to facilitate and manage creation of the embedded expressions.

SUMMARY OF THE INVENTION

One embodiment of the invention relates to a system for generating embedded expressions configured to generate a result. The system includes an embedded expression generation engine configured to generate a root expression, including at least one parameter. The parameter includes an assigned embedded expression configured to generate a result based on one or more input parameters. The system further includes an embedded expression user interface configured to display the root expression and associated parameters and embedded expressions and provide expression generation tools allowing the user to modify the root expression.

Another embodiment of the invention relates to a method for generating embedded expressions configured to generate a result,. The method includes receiving a selection of a root expression, the root expression including at least one parameter and designating the at least one parameter as a child node and the expression as a parent node to generate a hierarchical structure. For each parameter, the method includes receiving a selection indicating whether an embedded expression is to be assigned to the parameter, each embedded expression including at least one parameter. The method further includes displaying the hierarchical structure in a user interface Yet another embodiment of the invention relates to a system for generating embedded expressions configured to generate a result. The system includes a memory queue configured to receive and store a listing of data elements, each data element including a plurality of data element fields and representing a good for sale in a retail environment. The system further includes an embedded expression generation engine configured to generate a root expression, including at least one parameter, the parameter having an assigned embedded expression configured to generate information related to the good for sale in a retail environment based on one or more input parameters. The system yet further includes an embedded expression user interface configured to display the root expression and associated parameters and embedded expressions and provide expression generation tools allowing the user to modify the root expression.

This summary and the following detailed description are directed to certain specific embodiments of the invention. The invention is not limited to the particular embodiments and applications described herein. The invention is defined only by the claims.

DETAILED DESCRIPTION OF THE PREFERRED EMBODIMENTS

Figure 1:
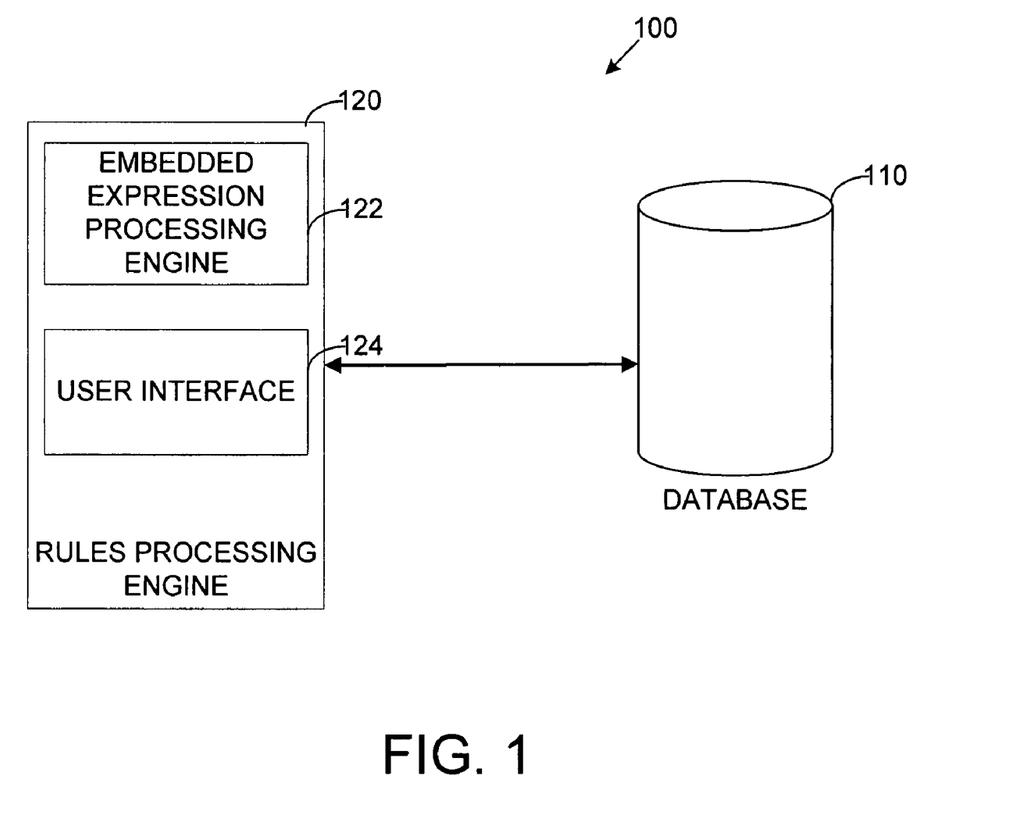
FIG. 1 is a system for allowing a user to generate one or more embedded expressions consisting of a process which generates a result based on input parameter values that may be assigned to an input parameter of an expression, according to an exemplary embodiment.

Referring to FIG. 1, a system 100 for allowing a user to generate one or more embedded expressions consisting of a process which generates a result based on input parameter values that may be assigned to an input parameter of an expression is shown, according to an exemplary embodiment. System 100 includes a data elements database 110 and a rules processing engine 120. Although a particular configuration of system 100 is shown, system 100 may be implemented using a single processing system and database, a plurality of processing systems, a plurality of databases, etc. to perform the functions described herein. System 100 may further be configured to include more, fewer, and/or a different configuration of components to perform the functions described herein.

Database 110 may be any database or other collection of data configured to store a massive number of data elements. Database 110 may be configured to implement standard database functionality, including but not limited to, storage of data elements, retrieval of data elements, data element sorting, etc. Database 110 may be implemented using RAM, ROM, one or more hard drives, or any other type of memory device. An exemplary database may be a database of a data elements where each data elements is representative of an article or type of article for sale in a retail setting. Other data elements may include entries in a table, computer records, products, a product class, etc. Each data element may be configured to include one or more data element fields. Exemplary data element fields may include information associated with the particular element. According to the exemplary embodiment, the data element fields may be information related to the article for sale such as an identification number, a description, a color, pricing information, markdown information, etc. Although a database is described, data elements may alternatively be stored in a table, a linked list, or any other large data storage system or method.

Rules processing engine 120 may be any type of processor configured to implement one or more processing rules to process data elements stored in database 110. Processing rules may be implemented as computer code including a plurality of instructions to be implemented using a computer processor. Rule engine 120 is configured to process data based on rules that can vary greatly dependent on the type of data being processed. Rules processing engine 120 may be configured to include an embedded expression processing engine 122, and an embedded expression generation user interface 124.

Embedded expression processing engine 122 may be any type of processing engine configured to generate and implement embedded expressions and drive the embedded expression generation user interface 124. An expression consists of a process which generates a result. A rule, as introduced above, may be an example of an expression. The expression may generate the result based on a provided input parameter. An expression is further configured to allow another expression to serve as the input parameter. Expressions and expression generation are described in further detail below with reference to FIGS. 2 and 3.

Figure 2:
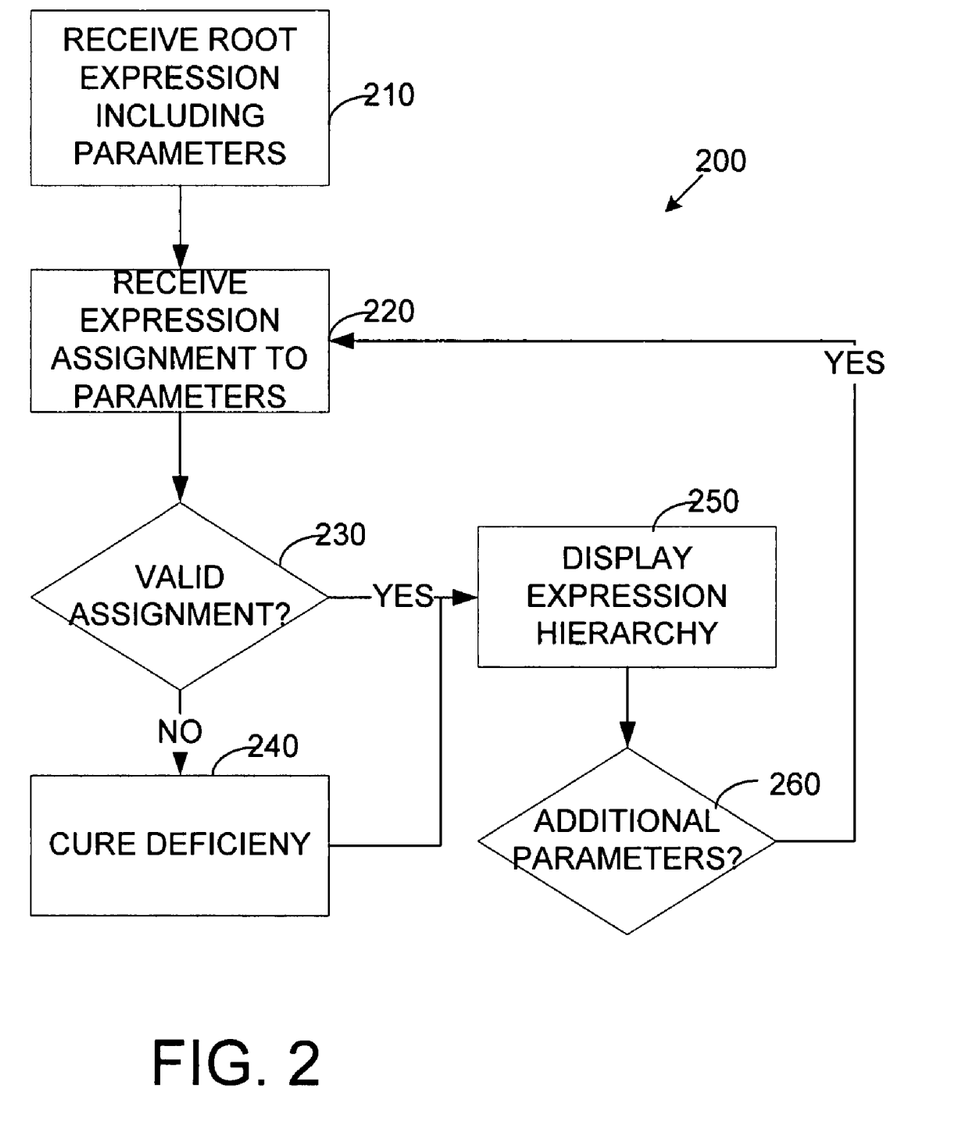
FIG. 2 is a flowchart illustrating a method for applying a rule to one or more data elements based on satisfaction of a condition, according to an exemplary embodiment.

Referring now to FIG. 2, a flowchart 200 illustrating a method for creating embedded expressions is shown, according to an exemplary embodiment. Although specific steps are shown and described as being performed in a specific order, it should be understood that the method may include more, fewer, and/or a different configuration of steps to implement the method described herein.

In a first step 210 an initial expression is selected, the expression selection including assignment of the expression to a parameter. According to an exemplary embodiment, the expression is a process that generates a result based on an input parameter. Assignment of an expression to a parameter can include selection of an expression from a listing of available expressions. The listing of available expressions can be generated based on the parameter, based on the application for which the rules processing engine is being implemented, based on a listing of all available expressions, etc. The expression can be selected from a drop down menu of available expressions, manually inserted by a user, otherwise selected by a user, etc. The parameter may be similarly selected according to a number of methods.

Following assignment of the parameter, one or more embedded expressions can be associated with one or more associated parameters in a step 220. Associating an expression with a parameter may be accomplished by selecting an expression associated with the parameter from a drop down menu in a user interface.

In a step 230, a determination is made whether the assignment of the expression to the parameter is valid. An expression can be assigned as long as it is, in turn, associated with an input parameter. Accordingly, an assignment binds two expressions using the input parameter of an expression and the result parameter that is the result of its assigned expression. The parameter associated with the parameter associated based on the assigned expression may be considered a child parameter.

If the assignment is invalid, the method may be configured to facilitate allowing the user to cure the deficiency in a step 240. Curing the deficiency may include selecting an input parameter, selecting an alternate expression, removing the expression, etc.

If the assignment is valid, the method may be configured to display the resultant parameter including the assigned expression having an input parameter on user interface 124 in a step 250. Displaying the resultant parameter may include displaying the parameter, the embedded expression, and the input parameter in a tree structure to facilitate understanding of the assignment.

Following successful assignment, the method may further include determining whether any additional expressions are to be assigned in a step 260. The additional expression may be assigned to the original parameter, child parameters associated with the original parameter based on an assigned expression, parameters associated the child parameters, etc.

The method may be iteratively performed as desired by the user to create a complex "tree structure" of embedded expressions including child nodes and parent nodes. The complex expressions allow the user to process a large number and type of data elements using a flexible, intuitive interface.

Figure 3:
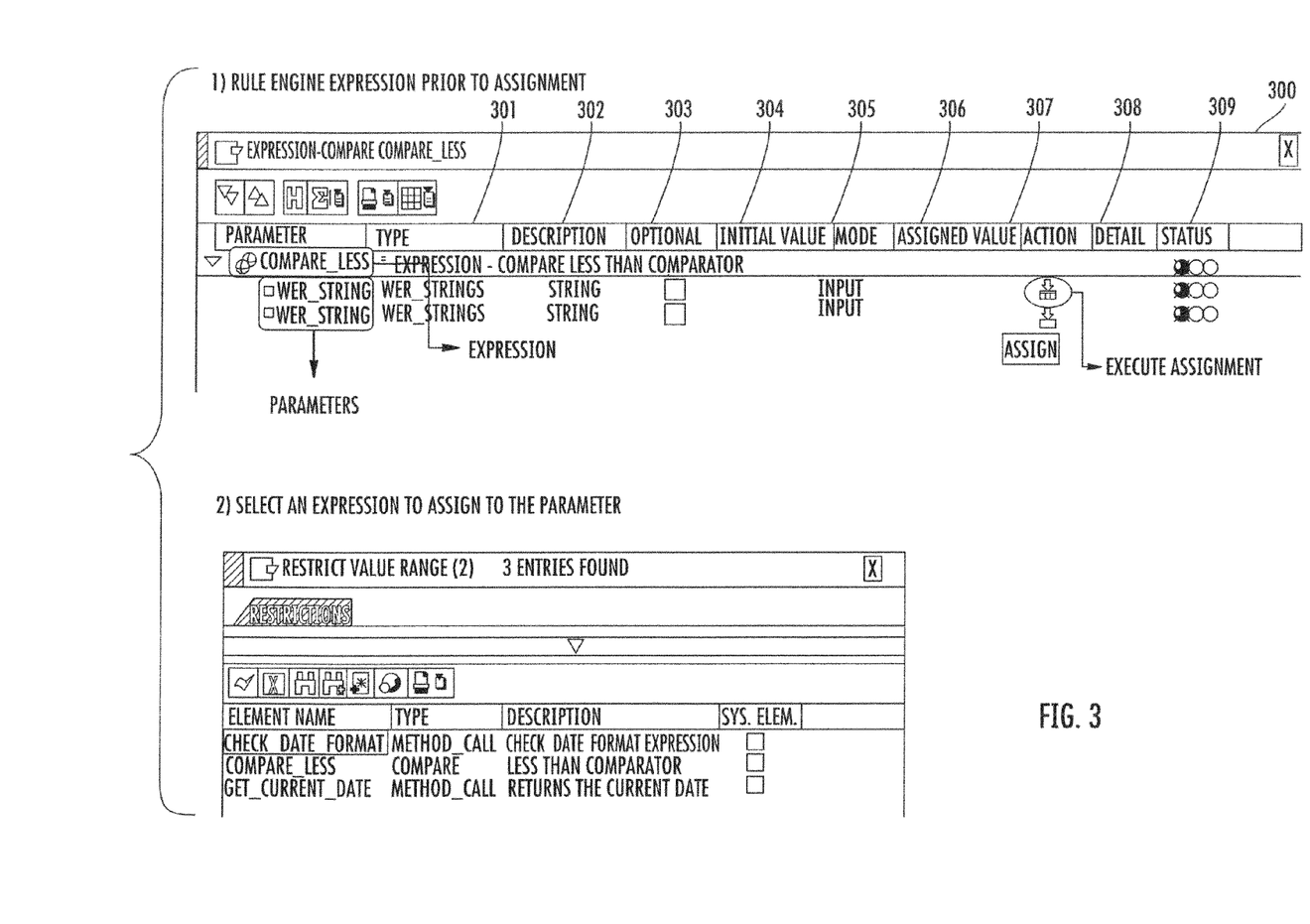
FIG. 3 is a representation of data element processing using the method of FIG. 2, according to an exemplary embodiment.

Referring now to FIG. 3, an embedded expression generation user interface 300 using the method of FIG. 2 is shown, according to an exemplary embodiment. User interface 300 is configured to allow creation of embedded expressions using a tree structure where the root node is an expression having child nodes that are its parameters. When assigning an expression to a parameter, a node is added as a child of the parameter consisting of the assigned expression which in turn is associated with child nodes representing its parameters. Accordingly, user interface 300 is configured to allow user to create recursive assignments using an intuitive interface.

User interface 300 may be configured to include a type definition column 301, a description column 302, an optional selection box column 303, an initial value column 304, a mode column 305, an assigned value column 306, an action column 307, a detail column 308, and a status column 309. Although particular columns are shown in a particular order, it should be understood that the number of columns, the content of the columns, the organization of the columns, etc. is customizable based on user preference, desired functionality, etc. Initial value column 304, mode column 305, assigned value column 306, detail column 308, and status column 309 may be automatically populated and updated field that are populated based on information associated with the parameter and/or column. For example, status column 309 may be configured to provide visual indicia regarding whether the expression and/or column has one or more associated problems that need to be addressed by the user. For example, an expression can only be assigned as long as it has input parameters. Action column 307 may be associated with a function that can performed by the user. For example, an action associated with an expression can include an action assigning one or more parameters to the expression.

Columns 301-309 may be descriptive and/or functional depending on the particular function being performed and the purpose of the column. For example, type definition column 301 and description column 302 are informational columns configured to allow the user to understand the purpose of the expression and/or parameter associate with the column entry.

As shown in FIG. 3, a root expression 302 entitled "COMPARE_LESS" has been selected to receive two assigned parameters. The number of assigned parameters may be dependent on the particular expression selected. Each of the parameters may include a selectable item in action column 307 allowing assignment of an expression to the parameter.

Selection of the selectable item in action column 307 may launch an assignment action "pop up" window 310, shown in FIG. 3B, according to an exemplary embodiment. Window 310 may be configured to include a listing of expressions that are assignable to the particular parameter associated with the selectable item. Each expression display in window 310 may be associated with a type column 311 display the type of expression, a description column 312 displaying information regarding the expression, and a "System Element" designation column 312 [What is this for?].

Following selection of an expression in window 310, the complete expression including the new expression associated with the parameter may be displayed to the user in an updated interface 320, as shown in FIG. 3C, according to an exemplary embodiment. The assigned value column 306 of the parameter may further be updated to display the expression assigned to the parameter. Accordingly, the value of the result/output parameter of the assigned expression is used as a value for the parameter of the root expression.

Figure 4:
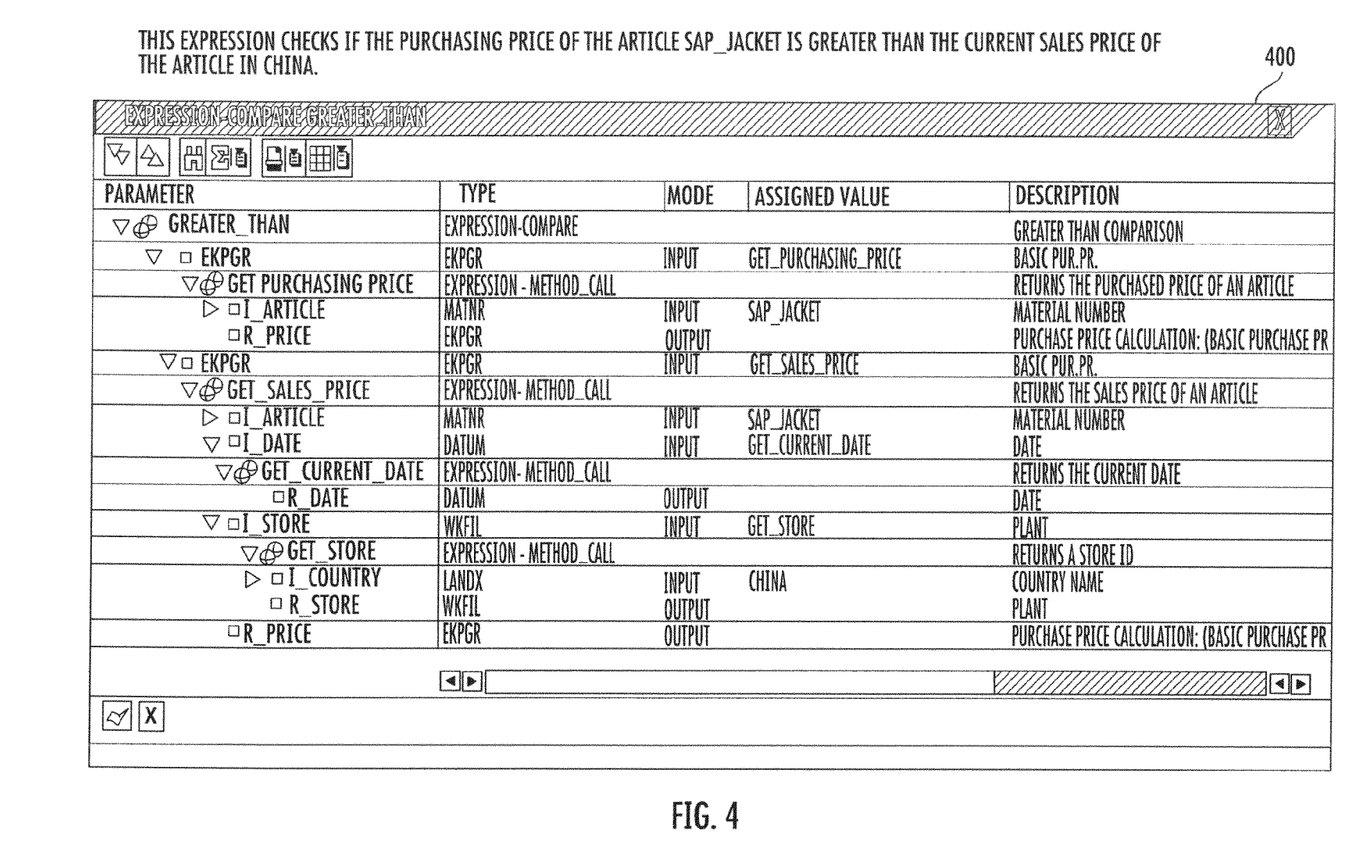
FIG. 4 is an interface representing an complex expression configured to determine whether the purchasing price of an article entitled "JACKET" is greater than the current sales price of the article in China, according to an exemplary embodiment.

Referring now to FIG. 4, an interface 400 representing an complex expression configured to determine whether the purchasing price of an article entitled "JACKET" is greater than the current sales price of the article in China is shown, according to an exemplary embodiment. As shown in interface 400, embedded expressions, where each embedded expression has an input parameter is assigned to assigned to an expression, may be used to intuitively generate a flexible, reusable rule to perform operations on data stored in database 110.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for generating embedded expressions configured to generate a result, comprising:
   a computer-readable medium having computer-executable instructions stored thereon, the computer-executable instructions being executed by a processor to implement
      an embedded expression processing engine configured to generate a root expression and at least one parameter associated with the root expression; and
      an embedded expression user interface configured to display the root expression and the at least one associated parameter, wherein the embedded expression user interface is configured to allow a user to select an embedded expression to assign to the parameter,
      wherein the embedded expression processing engine is configured to perform a first operation based on the embedded expression to obtain an embedded expression output, wherein a value of the at least one parameter of the root expression is based on the embedded expression output, wherein the embedded expression processing engine is configured to perform a second operation based on the root expression and the value of the at least one parameter to obtain a root expression output.

2. The system of claim 1, wherein the embedded expression user interface is configured to provide a visual indicia indicating whether the at least one parameter associated with the root expression is complete.

3. The system of claim 1, wherein the embedded expression processing engine is configured to require that the assigned embedded expression is associated with one or more input parameters.

4. The system of claim 1, wherein the embedded expression processing engine is configured to allow iterative assignment of embedded expressions and parameters to generate a hierarchical expression structure.

5. The system of claim 1, wherein the embedded expression user interface is configured to display a listing of embedded expressions that can be assigned to at least one parameter based on a selection by a user.

6. The system of claim 5, wherein the listing of embedded expressions is determined based on the root expression associated with the at least one parameter.

7. The system of claim 1, wherein the embedded expression user interface is configured to display current values associated with parameters.

8. A computer-implemented method for generating embedded expressions configured to generate a result, comprising:
receiving, from an embedded expression user interface, a selection of a root expression, the embedded expression user interface being implemented using computer-executable instructions executable by a processor and stored on a computer-readable medium, the root expression including at least one parameter;
designating, using an embedded expression processing engine, the at least one parameter as a child node and the root expression as a parent node to generate a hierarchical structure, the embedded expression generation engine being implemented using computer-executable instructions executable by the processor and stored on the computer-readable medium;
providing an interface, using the embedded expression user interface, that enables a user to assign an embedded expression to the at least one parameter, wherein the embedded expression is associated with at least one embedded parameter, wherein the embedded expression is designated as a child node of the at least one parameter and the embedded parameter is designated as a child node of the embedded expression in the hierarchical structure, wherein the embedded expression processing engine is configured to perform a first operation based on the embedded expression and the embedded parameter to obtain an embedded expression output, wherein a value of the at least one parameter of the root expression is based on the embedded expression output, wherein the embedded expression processing engine is configured to perform a second operation based on the root expression and the value of the at least one parameter to obtain a root expression output; and
displaying the hierarchical structure using the embedded expression user interface.

9. The method of claim 8, wherein the embedded expression user interface is configured to provide a visual indicia indicating whether the parameter is complete.

10. The method of claim 8, further comprising displaying a listing of embedded expressions that can be assigned to at least one parameter based on a selection by a user via the embedded expression user interface.

11. The method of claim 10, wherein the listing of embedded expressions is determined based on the expression that is the parent node for the parameter.

12. The method of claim 8, wherein the embedded expression user interface is configured to display current values associated with parameters.

13. A system for generating embedded expressions configured to generate a result, comprising:
a memory queue configured to receive and store a listing of data elements, each data element including a plurality of data element fields and representing a good for sale in a retail environment; and
a computer-readable medium having computer-executable instructions stored thereon, the computer-executable instructions being executed by a processor to implement
an embedded expression processing engine configured to generate a root expression and at least one parameter associated with the root expression, the parameter being related to the good for sale in the retail environment; and
an embedded expression user interface configured to display the root expression and the at least one associated parameter, wherein the embedded expression user interface is configured to allow a user to select an embedded expression to assign to the parameter, the embedded expression being associated with at least one embedded parameter,
wherein the embedded expression processing engine is configured to perform a first operation based on the embedded expression and the at least one embedded parameter to obtain an embedded expression output, wherein a value of the at least one parameter of the root expression is based on the embedded expression output, wherein the embedded expression processing engine is configured to perform a second operation based on the root expression and the value of the at least one parameter to obtain a root expression output.

14. The system of claim 13, wherein the embedded expression user interface is configured to provide a visual indicia indicating whether the parameter is complete.

15. The system of claim 13, wherein the embedded expression processing engine is configured to require that the assigned embedded expression is associated with one or more input parameters.

16. The system of claim 13, wherein the embedded expression processing engine is configured to allow iterative assignment of embedded expressions and parameters to generate a hierarchical expression structure.

17. The system of claim 13, wherein the embedded expression user interface is configured to display a listing of embedded expressions that can be assigned to at least one parameter based on a selection by a user.

18. The system of claim 17, wherein the listing of embedded expressions is determined based on the root expression associated with the at least one parameter.

19. The system of claim 13, wherein the embedded expression user interface is configured to display current values associated with parameters.

20. The system of claim 1, wherein the first operation and the second operation are mathematical operations, wherein the embedded expression output and the value of the at least one parameter of the root expression are mathematical values, wherein the embedded expression processing engine is configured to perform the first mathematical operation based on the embedded expression to obtain the mathematical value of the embedded expression output, wherein the mathematical value of the at least one parameter of the root expression is based on the mathematical value of the embedded expression output, wherein the embedded expression processing engine is configured to perform the second mathematical operation based on the root expression and the mathematical value of the at least one parameter to obtain the root expression output.

* * * * *